United States Patent [19]

Ross

[11] Patent Number: 4,782,861

[45] Date of Patent: Nov. 8, 1988

[54] MULTIPLE OUTLET CYLINDER VALVE

[75] Inventor: Albert Ross, Elyria, Ohio

[73] Assignee: Western/Scott Fetzer Company, Westlake, Ohio

[21] Appl. No.: 913,021

[22] Filed: Sep. 29, 1986

[51] Int. Cl.[4] .......................... F16K 1/02; F16K 31/12
[52] U.S. Cl. ..................................... 137/613; 137/872; 137/883; 137/886; 137/505.38
[58] Field of Search ............... 137/613, 883, 886, 872, 137/71, 505.38

[56] References Cited

U.S. PATENT DOCUMENTS

| | | | |
|---|---|---|---|
| 1,291,401 | 1/1919 | Caven | 137/872 |
| 1,398,845 | 11/1921 | Davis | 137/872 |
| 1,472,265 | 10/1923 | Bell | 137/886 |
| 3,211,175 | 10/1965 | Replogle | 137/71 |
| 3,384,133 | 5/1968 | Gordon | 137/613 |
| 3,885,590 | 5/1975 | Ford et al. | 137/613 |
| 4,274,440 | 6/1981 | Richard, Jr. | 137/613 |
| 4,341,237 | 7/1982 | Stauffer | 137/613 |
| 4,523,516 | 6/1985 | Foster et al. | 251/63.6 |

Primary Examiner—A. Michael Chambers
Attorney, Agent, or Firm—Pearne, Gordon, McCoy & Granger

[57] ABSTRACT

A compressed gas supply system is disclosed which includes a pressure tank for a predetermined compressed gas. An outlet valve is mounted on the pressure tank and includes at least two outlet ports. One outlet port is provided with a size and thread configuration proportioned to meet a first industry standard for connection of equipment using the compressed gas within the tank. The other port has a size and thread configuration different from the one port, and proportioned to meet a second different standard for connection of equipment using the compressed gas. An automatic pressure-regulating valve is provided in one of the ports to reduce the pressure delivered to such port to a maximum pressure less than the maximum pressure allowable in the associated outlet port. The valve reduces the inventory requirements by permitting the use of a single valve and tank combination to connect with distribution systems for the compressed gas having different maximum pressure values.

10 Claims, 2 Drawing Sheets

MULTIPLE OUTLET CYLINDER VALVE

BACKGROUND OF THE INVENTION

This invention relates generally to compressed gas, storage and distribution systems and, more particularly, to a novel and improved valve for tanks containing compresssed gas such as oxygen, acetylene, nitrogen and the like.

PRIOR ART

Compressed gas is often stored and delivered in pressure cylinders or tanks. Such tanks are provided with valves having a threaded outlet for connecting to the system in which the compressed gas is used. For example, oxygen is often used in hospitals for medical purposes. In such installation, the oxygen tank is connected to an elaborate, permanently installed distribution piping system through which the oxygen is supplied in various locations in the building.

In other instances, welding facilities often provide elaborate, permanently installed oxygen distribution systems for delivering oxygen from the supply tanks to the welding work stations. Similar delivery systems are often used to distribute other gases under pressure.

Various delivery systems are rated for a specified maximum supply pressure. Serious problems can occur if the wrong compressed gas is supplied to a particular distribution system. Also, serious problems can be encountered if the correct gas is supplied to a distribution system at a pressure above the system's rated maximum pressure. In order to eliminate such problems, the Compressed Gas Association has established different size and thread forms for the outlet ports of supply tank valves for the various types of compressed gases and for various pressures of a given gas. These published standards, generally referred to as CGA Standards, are uniformly used by the various segments of the compressed gas industry to prevent improper connection of supply tanks to equipment in which the compressed gas is used.

For example, supply tanks filled with oxygen at a pressure of 3,000 psi, are provided with a valve having a threaded outlet port meeting the published specification referred to as CGA 540. On the other hand, a supply tank containing oxygen at a pressure of 4,000 psi is provided with a valve having a threaded outlet port conforming to the published standard CGA 577, while a valve on a supply tank containing oxygen under a pressure of 5,500 pounds is provided with a threaded outlet for meeting the standard CGA 701.

If a given oxygen delivery or distribution system has a maximum pressure rating of 3,000 psi, the female coupling part for connecting the system to the supply tank is sized and provided with a thread form meeting the CGA 540 published standard and, for correspondingly different pressures, such female coupling part is selected to meet the various pressure standards involved. Similarly, if a given tank is used to supply acetylene or other compressed gas, the tank valve is provided with a male threaded outlet port which meets the particular CGA published specification for the given gas and the given maximum pressure involved.

As newer equipment is installed, there is a tendency to install delivery systems having higher maximum pressure ratings. Consequently, at a given installation, one part of the delivery or distribution system may have a maximum pressure rating of 3,000 psi and a newer section of the delivery or distribution system may have a maximum pressure rating, for example, of 4,000 psi. In such instances, it is generally necessary to maintain an inventory of two different supply tanks. In such example, one group of tanks is supplied with compressed gas under 3,000 psi and another group of tanks contains compressed gas at 4,000 psi. This results in the requirement of excessive inventories of supply tanks containing compressed gas and increases inventory and storage costs.

SUMMARY OF THE INVENTION

In accordance with the present invention, a novel and improved tank valve for compressed gas is provided with a plurality of threaded outlets. In instances in which the supply tank containing a particular compressed gas, for example, oxygen under pressure for distribution systems having different maximum pressure ratings, one of the outlet ports on the valve is combined with a pressure-reducing pressure regulator which operates to ensure that the oxygen pressure delivered through such port does not exceed the maximum pressure rating for that particular outlet port. Another outlet port provided by the valve body is in direct communication with the interior of the supply tank and is provided with a size and thread form corresponding to the maximum pressure of the oxygen contained within the tank.

The illustrated embodiment of this invention combines a single supply tank and a tank valve having two threaded male outlet ports. One of the ports is sized to meet the specification for a supply pressure of 4,000 psi. When the valve is opened, direct communication is provided between such port and the interior of the tank. The other threaded male outlet port is sized to meet the CGA standards for oxygen under pressure, a pressure of 3,000 psi.

Built into the valve ahead of such second port is a pressure-reducing regulator connected between such second port and the interior of the tank. This regulator automatically reduces the pressure of the oxygen supplied from the tank from the maximum 4,000 psi value to a pressure no greater than 3,000 psi. Consequently, the single tank can be simultaneously connected to one distribution system having a maximum pressure rating of 4,000 psi and a second distribution system having a maximum pressure rating of 3,000 psi. Therefore, with a valve and tank incorporating this invention, it is not necessary to inventory two groups of tanks having two different maximum pressures and the needs of the two separate distribution systems can be met with a single tank. Alternatively, one of the outlet ports is connected to an appropriate distribution system and the other port is closed with a sealing cap. Here again, inventory problems and costs are minimized since a single inventory of tanks containing the higher pressure can be used separately for two distribution systems having different maximum supply pressure ratings.

In accordance with another aspect of this invention, a given valve can be provided with two or more outlet ports, each sized and threaded to conform to a particular standard size rating for a particular gas. For example, some equipment or distribution systems for acetylene are provided with one size of female coupling and other equipment or distribution systems for acetylene are provided with female coupling members of a different size. Although the maximum pressure rating for equipment and distribution systems for acetylene does not usually differ, it is common for acetylene distribution systems to have two different connector sizes. In such instances, the tank supply valve is provided with two ports of different sizes, one sized and threaded to match one type of equipment and the other sized and threaded to match the coupling on other types of equipment. In such instances, where the pressure may be the same for both of the systems, the tank valve is provided with two threaded outlet ports of the two different sizes but a pressure regulator is not required. However, the same basic advantages are achieved in such system and a single inventory of cylinders can be used to connect to different sized distribution systems or equipment without requiring special adapters or the like.

These and other aspects of this invention are illustrated in the accompanying drawings and are more fully described in the following specification.

DETAILED DESCRIPTION OF THE DRAWINGS

Figure 1:
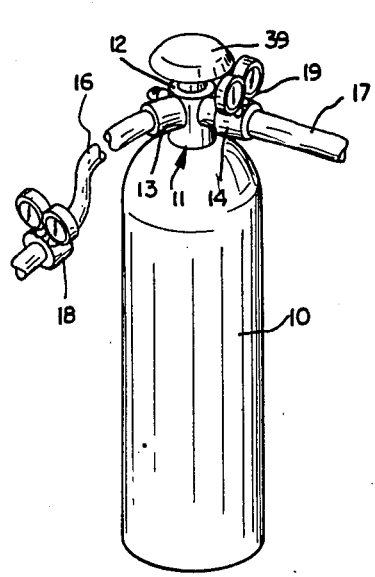
FIG. 1 is a schematic illustration of an oxygen supply tank containing oxygen under pressure and having a tank valve providing a first outlet port connected to a first delivery system having a maximum pressure rating equal to the maximum supply pressure of the tank and a second outlet port connected to a second delivery system having a lower maximum pressure rating.

FIG. 1 schematically illustrates one preferred embodiment of a compressed gas supply system in accordance with the present invention. Such system includes a pressure tank or cylinder 10 containing gas under pressure. For purposes of illustration, the following specification describes an oxygen supply system. However, it should be understood that an oxygen supply system is described and illustrated only by way of example and that, in accordance with the present invention, supply systems can be provided for other types of gas such as acetylene, nitrogen and any other gas normally supplied under pressure from tanks.

Such tanks are usually positioned in the vertical position and mounted on the upper end of the tank is a valve 11. The valve 11 provides a body assembly 12 having at least two outlet ports 13 and 14. The first of the outlet ports 13 is connected to a first distribution or delivery system schematically illustrated at 16 and the second of the outlet ports 14 is connected to a separate second delivery or distribution system schematically illustrated at 17.

It should be understood that each of the delivery systems 16 and 17 may be in the simplest form, piping leading to apparatus utilizing the particular compressed gas contained within the tank. The two distribution systems 16 and 17 usually include pressure regulators 18 and 19, respectively, which automatically reduce the pressure delivered through the associated outlet port to pressure values compatible with the equipment to which the compressed gas is delivered.

Such regulators 18 and 19 may in some cases be mounted directly on the associated port 13 and 14 or may be remotely mounted and connected to the associated port by means of suitable piping. In some instances, the pressure distribution system 16 or 17 may supply a single apparatus which uses the compressed gas. In other instances, the distribution system may connect to a multiplicity of locations in which the compressed gas is used. For example, in a hospital, the distribution system may be quite elaborate and connect to many different rooms such as operating rooms or patient care rooms where the compressed oxygen is required.

Figure 2:
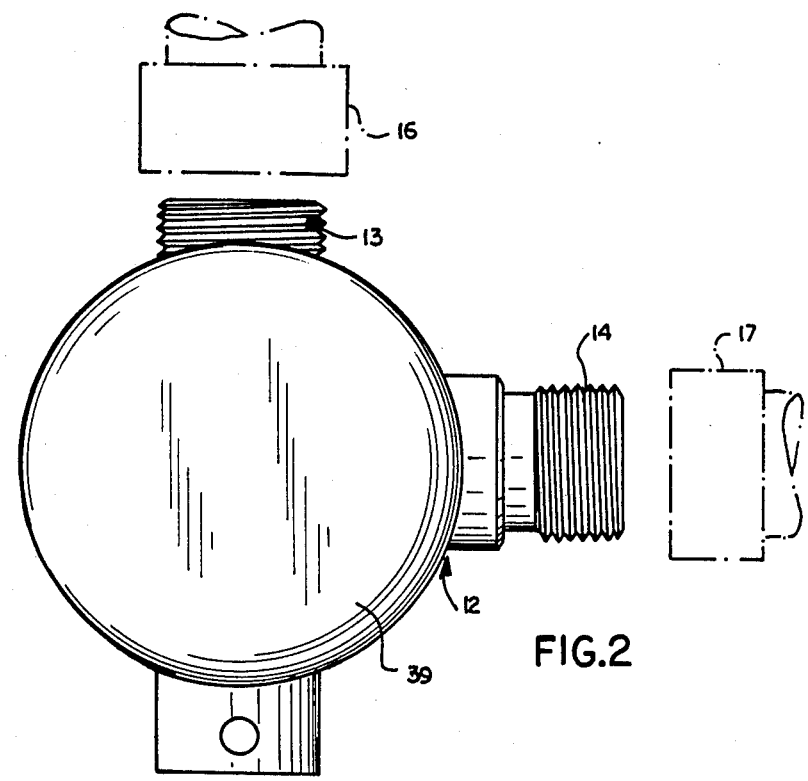
FIG. 2 is a plan view of the valve illustrated in FIG. 1.
Figure 3:
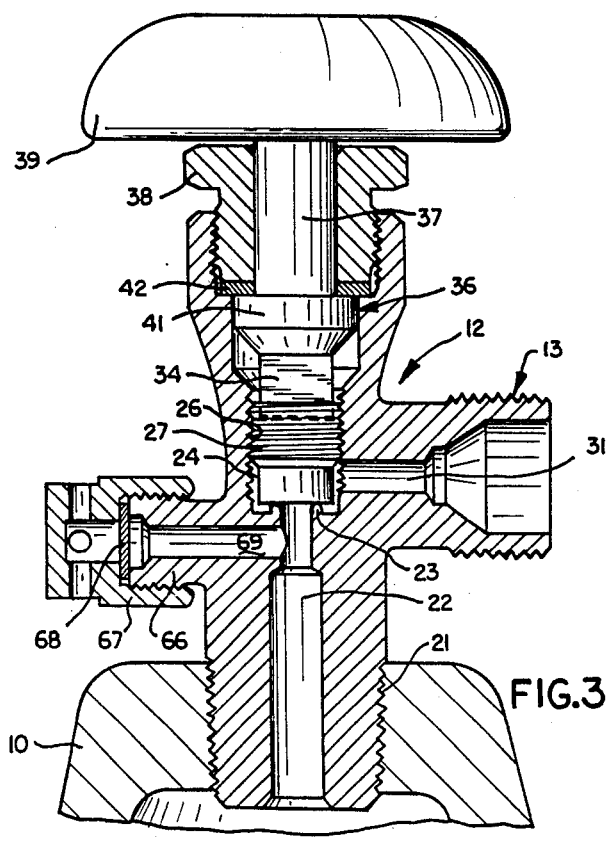
FIG. 3 is a first side elevation, longitudinal section taken along a plane through one of the outlet ports.
Figure 4:
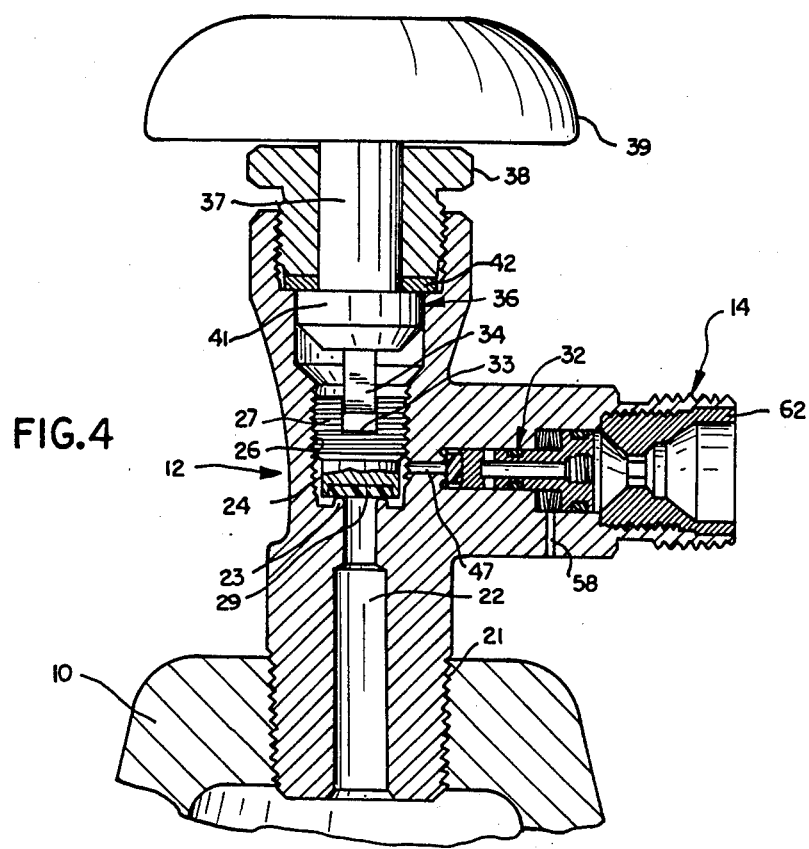
FIG. 4 is a side elevation and longitudinal section taken along a second plane through the second outlet port.

Referring to FIGS. 2 through 4, the body assembly 12 provides a threaded inlet portion 21, threaded into the upper end of the tank 10. The inlet portion 21 is provided with an inlet passage 22 open at its upper end through a valve seat 23 to a valve chamber 24. The portion of the valve chamber 24 immediately above the valve seat 23 is provided with threads 26. An externally threaded main valve element 27 engages the threads 26 and is movable toward and away from the valve seat 23 in response to rotation of the valve element 27 with respect to the body assembly 12. Mounted in the end of the valve element is a resilient sealing disk 29 (illustrated in FIG. 4) positioned for engagement with a valve seat when the valve is closed and movable away from the valve seat when the valve element is in its open position. The closed position is illustrated in FIGS. 3 and 4. In the closed position illustrated, the inlet passage 22 is isolated from the valve chamber 24.

Both of the outlet ports 13 and 14 are in communication with the valve chamber 24. The outlet port 13 is in direct communication with the valve chamber 24 through a lateral passage 31, as illustrated in FIG. 3, and the outlet port 14 communicates with the valve chamber 24 through an automatic pressure-regulating valve system 32. The pressure regulator 32 functions as described in greater detail below to ensure that the pressure of the compressed gas delivered to the second outlet port 14 is below a predetermined maximum supply pressure for the distribution system 17.

The main valve element 27 is provided with a cross slot 33 proportioned to receive a laterally extending drive blade 34 on the inner end of a manually-operated valve stem unit 36. The valve stem unit is provided with a cylindrical shank portion 37 which extends through a gland nut 38 and connects with an exteriorly mounted valve operating handle 39. Between the cylindrical shank portion 37 and the drive blade 34 is an enlarged shoulder 41 which engages on its rearward side, a packing gland 42. The packing gland 42 is preferably formed as a flat washer-like element which provides a seal between the housing assembly 12 and the gland nut 38 and also between the gland nut and the valve stem unit 36.

When the handle 39 is rotated in one direction, it causes movement of the main valve element 27 toward the valve seat to close the valve; and when the handle is rotated in the opposite direction, the main valve element is threaded back away from the valve seat 23 to its open position. The cross slot 33 and the drive blade 34 allow relative axial movement between the main valve element 27 and the valve stem unit 36 while preventing relative rotation therebetween. Consequently, opening and closing of the valve do not require axial movement of the valve stem unit 36.

Figure 4A:
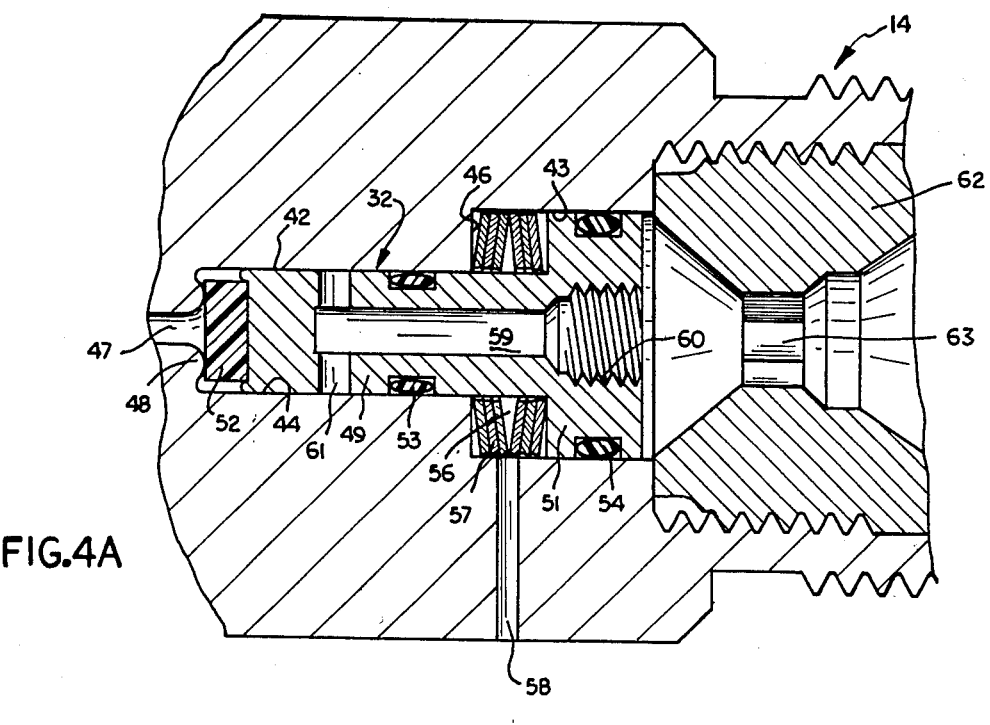
FIG. 4A is an enlarged, fragmentary section illustrating the structural detail of the pressure regulator illustrated in FIG. 4.

The pressure regulator 32 has a structure best illustrated in FIGS. 4 and 4a. Such regulator includes a valve poppet 42 positioned within a stepped bore including an inwardly extending large diameter cylindrical portion 43 and a smaller diameter cylindrical extension 44 extending coaxially beyond the larger diameter portion 43. The two bores 43 and 44 are joined by a radial shoulder 46.

A lateral passage 47 connects the inner end of the smaller diameter bore portion 44 and a valve chamber 24 through a valve seat 48.

A valve poppet 42 is provided with a forward stem portion 49 which extends into the smaller diameter bore 44 and a rearward larger diameter head portion 51 in the larger diameter cylindrical bore portion 43. Mounted on the forward end of the stem portion 49 is a resilient seal disk 52 which is movable between a closed position illustrated in FIGS. 4 and 4a in engagement with the valve seat 48 and a retracted or open position spaced from the valve seat 48. A first O-ring 53 mounted on the stem portion 49 provides a fluidtight dynamic seal between the smaller diameter extension bore 44 and the stem portion 49. A second O-ring seal 54 mounted on the head portion 51 of the valve poppet 42 provides a fluidtight dynamic seal between the head portion and the larger diameter cylindrical bore portion 43.

The stem portion 49 is provided with a length which spaces the head portion 51 from the shoulder 48 to provide a spring cavity 56 surrounding the stem portion 49. Located in the spring cavity 56 are a plurality of Belleville springs 57 which resiliently urge the valve poppet in an opening direction away from the valve seat 48. A vent 58 communicates with the spring cavity 56 to ensure that such cavity is maintained at atmospheric pressure.

The valve poppet is provided with an axial bore 59 extending from the rearward end of the valve poppet axially along the valve poppet to a cross bore 61. The outer end of the axial bore 59 is threaded at 60 so that a threaded element can be connected to the valve poppet when the valve poppet must be removed from the body assembly 12. Outwardly of the valve poppet is an externally threaded connector part 62 proportioned to seal with and connect to the coupling of a distribution system. This connector part is provided with a hexagonal opening 63 so that a suitable wrench can be inserted to install and remove the connector part 62.

The body assembly 12 is also provided with a third threaded projection 66 illustrated in FIG. 3. Threaded onto this projection 66 is a cap member 67 which positions a rupture disk 68 against the valve body assembly 12 and normally seals a lateral passage 69. In the event that excessive pressure develops within the tank, this disk ruptures serving to prevent tank failure.

With the present invention, a tank valve is provided with a plurality of outlet ports of different size so that a single tank and valve can be connected to two different distribution systems having different standard coupling sizes. If the two distribution systems require different supply pressures, the valve is provided with an automatic pressure regulator 32 which functions to ensure that the supply pressure does not exceed the maximum pressure of the connected distribution system. For example, if oxygen is contained in the tank at 4,000 psi and the distribution system connected to the second outlet port 14 cannot exceed 3,000 psi, the automatic pressure regulator 32 reduces the supply pressure to a pressure below 3,000 psi before delivering the compressed gas to the second outlet port.

As soon as the pressure contained within the port 14 reaches the regulating pressure of the pressure regulator 32, the pressure acting on the head portion 51 overcomes the force of the springs 57 and the valve poppet 42 moves to the left, causing the resilient seal 52 to engage the valve seat 48. Then, as the pressure in the outlet port 14 drops, the poppet is again moved to an open position so that the supply of compressed gas is maintained at a level below 3,000 psi. When the poppet 32 moves away from the seat 48, compressed gas flows around the forward end of the stem 42 and then through the bores 61 and 59 past the seals 53 and 54 to the outlet port 14. When the pressure within the tank drops below the regulated pressure, the valve poppet remains open and the pressure within the tank is supplied to the outlet port 14.

If two separate distribution systems are simultaneously connected to the valve 11, each of the outlet ports is connected to the mating distribution system. Therefore, with a single tank, two different distribution systems can be simultaneously applied.

In the event that a single distribution system is connected to the valve 11, the appropriate connection is provided to either the first outlet port 13 or the second outlet port 14. In that event, a cap, (not illustrated) is placed on the unused outlet port and functions to seal such outlet port against leakage. With this invention, it is not necessary to inventory supply tanks of compressed gas at various pressures or connector sizes. Consequently, inventory problems are drastically reduced, particularly in installations including two or more categories of distribution systems.

Although the preferred embodiment of this invention has been shown and described, it should be understood that various modifications and rearrangements of the parts may be resorted to without departing from the scope of the invention as disclosed and claimed herein.

What is claimed is:

1. A compressed gas supply system comprising a storage tank containing gas compressed to a pressure no greater than a maximum tank pressure, a valve on said tank including a body assembly, said body assembly providing a single inlet port providing the only connection with said tank and providing at least two threaded outlet ports, and a single shut-off manually operable valve in said body assembly operating in a closed position to isolate both of said outlet ports from said inlet port and in turn from said compressed gas in said tank and an open position operating to establish communication between both of said outlet ports and said compressed gas in said tanks, one of said outlet ports having a size and thread configuration proportioned to meet a first standard for connections of equipment using said compressed gas, the other of said outlet ports having a size and thread configuration different from said one port and proportioned to meet a second different standard for connection of equipment using said compressed gas, said single shut-off valve being the only manually operable valve for isolating said ports from said tank.

2. A compressed gas supply system as set forth in claim 1, wherein a pressure regulator is provided in said body assembly between said valve and said one port, said pressure regulator operating to reduce the pressure of said compressed gas delivered to said one port from said maximum pressure of said tank to a lower maximum pressure below said maximum pressure in said tank, the other of said ports being supplied with compressed gas at full tank pressure when said manually operable shut-off valve is open.

3. A compressed gas supply system as set forth in claim 2, wherein said pressure regulator includes a regulating valve assembly and a second valve seat, pressure in said one port producing a force urging said regulating valve assembly towards a closed position in which said regulating valve assembly engages said second valve seat, and resilient means supplying an opposing force urging said regulating valve element in a direction away from said second valve seat toward an open position, said resilient means producing sufficient force to move said regulating valve element to an open position only when the pressure in said one port is below said lower maximum pressure.

4. A compressed gas supply system as set forth in claim 3, wherein said body assembly provides a valve chamber connected to said storage tank through a first valve seat, said single valve including a main valve element movable into and out of engagement with said first valve seat to isolate said valve chamber from and connect said valve chamber to the interior of said tank, said pressure regulator including a stepped bore in said body assembly connecting said one outlet port and said valve chamber through said second valve seat, said stepped bore providing a reduced diameter portion open to said second valve seat and a larger diameter portion remote from said second valve seat open at its end remote from said second valve seat to said one port and joined at its other end to said smaller diameter portion by a shoulder, a regulating valve poppet having a stem portion in said reduced diameter portion and a head in said larger diameter portion, said head and shoulder cooperating to define a spring chamber, a vent connected to said spring chamber for venting said spring chamber, said resilient means being provided by springs in said spring chamber urging said head away from said shoulder, said poppet providing passage means through said head along which said compressed gas flows to said one port.

5. A compressed gas supply system as set forth in claim 4, wherein said spring is provided by a plurality of Belleville springs.

6. A compressed gas supply system as set forth in claim 5, wherein said poppet includes a central passage having threads to receive a threaded element for removing said poppet from said stepped bore.

7. A compressed gas supply system as set forth in claim 1, wherein said tank is a vertically generally cylindrical tank, said valve is mounted on the upper end of said tank, and said threaded outlet ports extend substantially horizontally.

8. A tank valve for compressed gas tanks comprising a body assembly having a threaded first projection for mounting said valve on a tank filled with gas compressed to a predetermined maximum tank pressure, said projection having an inlet passage providing the only connection between said body assembly and tank, a valve chamber in said body assembly connected to said passage extending through a first valve seat, a manually operable valve element in said valve chamber movable into and out of engagement with said valve seat, a first outlet port directly connected to said valve chamber and supplied with compressed gas at the pressure of said compressed gas within said tank when said manual valve is open, a second outlet port, a pressure-reducing regulator in said body assembly between said second outlet port and said valve chamber, said first ports having a size and thread configuration portion to meet a first standard for connections of equipment using said compressed gas at said maximum tank pressure, the other of said outlet ports having a size and thread configuration different from said one port and proportioned to meet a second different standard for connection of equipment using the same compressed gas at a maximum equipment pressure less than said maximum tank pressure, said pressure-reducing regulator including a regulating valve operable to reduce the pressure of compressed gas delivered to said second outlet port to a pressure less than said maximum equipment pressure.

9. A tank valve for compressed gas tanks, comprising a one-piece valve body, said valve body providing a first projection for mounting said body on a tank filled with compressed gas, a valve chamber in said body connected to a passage extending along said first projection through a first valve seat, said passage being adapted to provide the only connection between said tank and said valve chamber, a manually operable valve element in said valve chamber movable into and out of engagement with said first valve seat, said body providing a first outlet port directly connected with said valve chamber, said body providing a stepped bore open to said valve chamber through a second valve seat, said stepped bore providing a reduced diameter portion open to said second valve seat and a larger diameter portion remote from said valve seat joined to said smaller diameter portion by a shoulder, a pressure regulating valve poppet having a stem portion in said reduced diameter portion movable into and out of engagement with said second valve seat and a head portion in said larger diameter portion, said head and shoulder cooperating to define a spring chamber, said body providing a vent connected to said spring chamber for venting said spring chamber, a spring in said spring chamber urging said head away from said shoulder and said stem portion away from said second valve seat, said body providing a second outlet port communicating with said larger diameter portion on the side of said head portion remote from said stem portion, said regulating valve poppet providing passage means connecting said second valve seat and said second outlet port when said stem portion is spaced from said second valve seat.

10. A tank valve as set forth in claim 9, wherein said valve poppet is installable and removable through said outlet port.

* * * * *